United States Patent [19]

Holchuk

[11] 4,108,231
[45] Aug. 22, 1978

[54] VEHICLE WHEEL

[76] Inventor: Leonard J. Holchuk, 2053 Lake St., Elmira, N.Y. 14901

[21] Appl. No.: 730,205

[22] Filed: Oct. 6, 1976

[51] Int. Cl.$^2$ .............................................. B60C 7/18
[52] U.S. Cl. .................................................. 152/290
[58] Field of Search ................. 152/289, 290, 291, 262

[56] References Cited

U.S. PATENT DOCUMENTS

| 945,688 | 1/1910 | Bozarth | 152/290 |
|---|---|---|---|
| 1,025,209 | 5/1912 | Sears | 152/291 |
| 1,183,782 | 5/1916 | Vickery | 152/291 |
| 1,274,974 | 8/1918 | Bergstrom | 152/290 |

*Primary Examiner*—Robert B. Reeves
*Assistant Examiner*—Francis J. Bartuska
*Attorney, Agent, or Firm*—William J. Simmons, Jr.

[57] ABSTRACT

Disclosed is a wheel having two staggered rows of surface-gripping, radially-yielding feet. When the wheel encounters an obstacle, a spring compresses, thereby permitting the feet to deflect and absorb shock that would have otherwise been imparted to the vehicle. While travelling on a smooth surface, the feet deflect an amount depending upon the load carried by the wheel. Since the shock absorbing spring is recessed in a cavity in the foot, the distance that a foot can deflect is increased.

6 Claims, 3 Drawing Figures

VEHICLE WHEEL

BACKGROUND OF THE INVENTION

This invention relates to wheels for land vehicles and more particularly to wheels having spring-biased feet that retract when in contact with a road or other travelled surface. Such wheels are especially useful on vehicles for operating on rough terrain such as farm, construction and military equipment.

Spring wheels have been designed for use on automobiles, trucks and the like wherein the main consideration has been the provision of proper resiliency for smooth riding. Such wheels usually embody a tread portion formed of sections arranged end-to-end circumfirently of the wheel and yieldingly supported for independent inward movement to obtain a cushioning effect. These prior art wheels are merely intended to be substitutes for pneumatic tires, the feet thereof exhibiting a minimum amount of deflection. These wheels are therefore of limited utility over rough terrain.

SUMMARY OF THE INVENTION

It is therefore an object of the present invention to provide a wheel that is especially adapted for traversing rough terrain. Another object is to provide a spring wheel that is simple in design and inexpensive to construct.

Briefly, the wheel constructed in accordance with the present invention comprises a hub and means defining a plurality of chambers equally spaced around the hub. A foot, which is disposed in each chamber, is capable of radial movement therein, that portion of each foot nearest the hub having at least one cavity therein. Means are provided for restricting the movement of each of the feet beyond a predetermined distance from the hub so that those portions of the feet remote from the hub tend to lie in a substantially circular arc. At least one spring is disposed between each foot and the hub, one end of the spring being fixedly mounted with respect to the hub and the other end being disposed within the cavity of the associated foot.

DETAILED DESCRIPTION

It is noted that the drawings are for the purpose of illustration only, and they are not intended to be drawn to scale. Moreover, for the sake of illustration and description, a wheel having only 16 feet is illustrated, it being understood that wheels having any number of feet are contemplated by this invention, and indeed, wheels having a greater number of feet would be capable of providing smoother operation over any type of terrain.

Figure 1:
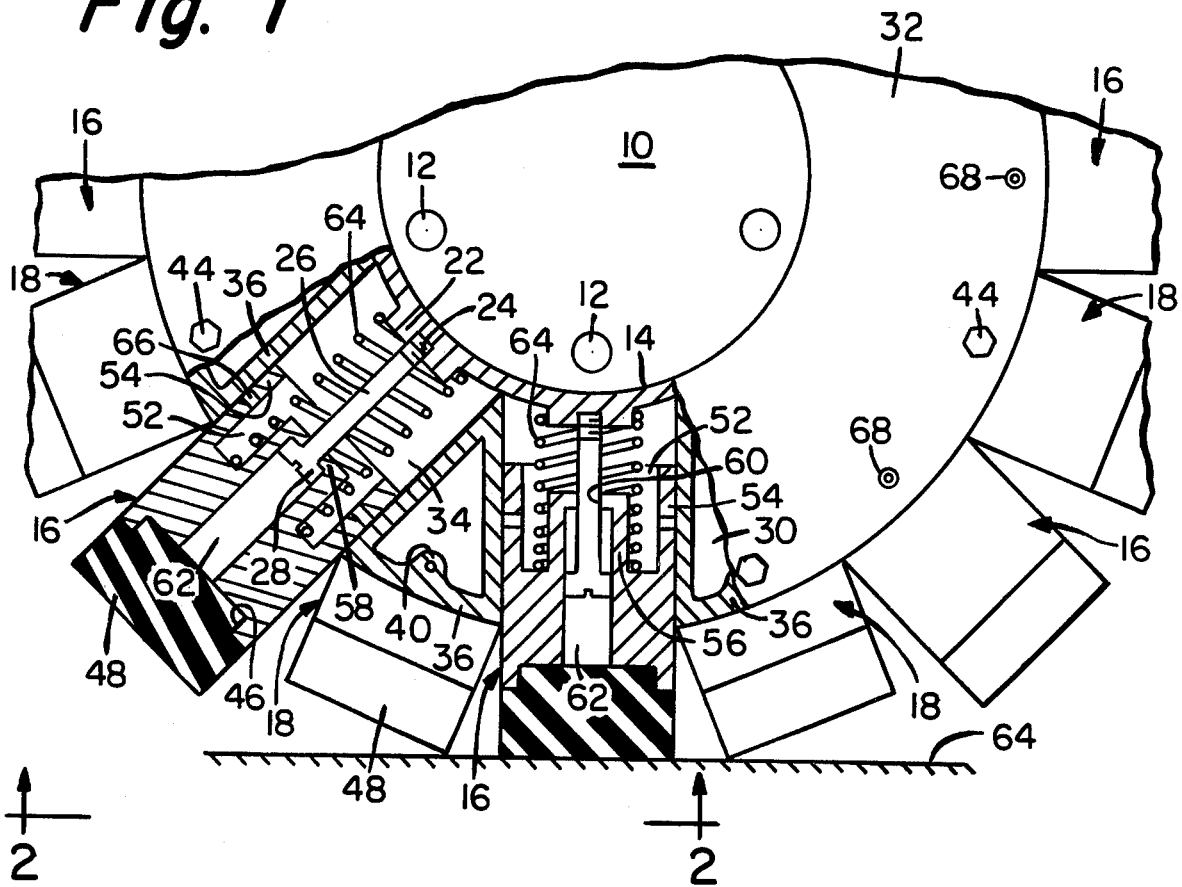
FIG. 1 is a fragmentary elevation of a portion of a wheel that embodies the present invention with parts broken away to reveal in detail two of the spring operated feet.
Figure 2:
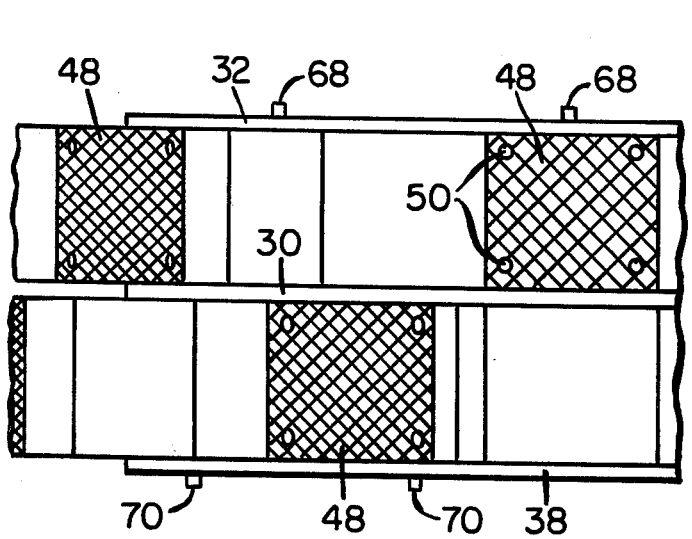
FIG. 2 is a view taken along lines 2—2 of FIG. 1.

Referring to FIGS. 1 and 2 there is shown a wheel comprising a hub 10 having a plurality of apertures 12 which are adapted to receive the lugs from the brake housing to which the wheel is to be attached. Hug 10 is centrally disposed between cylinder 14 to which one set of feet 16 are attached and a similar cylinder (not shown) to which a second set of feet 18 are attached.

The feet are arranged in circumfirential rows, the feet in each row being staggered with respect to the feet in adjacent rows. Any desired number of rows may be employed, but only two rows are illustrated in the drawing. The staggered, dual tread feature reduces vibration that is prevalent in the operation of wheels having a single tread row. Furthermore, additional tread rows afford greater traction in mud, snow, sand and the like.

Cylinder 14 is provided with a plurality of bosses 22 which have tapped bores 24 into which are inserted the threaded ends of rods 26. An enlarged round head 28 on each of the rods 26 contain a slot, allen bore or similar means to facilitate the screwing of the rods into their associated bosses.

Coplaner with hub 10 is an annular disk 30 which forms along with disk 32 the sidewalls of chambers 34. The remaining two sidewalls of each chamber 34 are formed by triangularly-shaped members 36 which may be secured to inner disk 30 by any suitable means such as welds, bolts or the like, or they may be cast integrally with the inner disk. A second outer disk 38 forms along with disk 30 and with a further plurality of triangularly-shaped members (not shown) the chambers for the second circumfirential row of feet 18. Disk 32 is secured to flanges 40 by bolts 44. The outer disks can therefore be easily removed to permit the replacement of damaged parts or weak springs. Feet 16 are guided in chambers 34, the opposite walls of the chambers being parallel and closely engaging the adjacent walls of the feet. This construction not only results in a mechanically strong wheel; it also prevents the entry of mud, stones and the like into the operating mechanism of the wheel.

The outer ends of feet 16 are provided with cups or sockets 46 in which tread blocks 48 are disposed. The tread blocks can be secured to their respective feet by bolts 50 which screw into tapped bores therein.

The inner end of each foot is provided with a cavity 52 that is surrounded on four sides by sidewalls 54. A hollow, protruding, cylindrically-shaped spring guide 56 extends into cavity 52 from the shank or main body of each foot. The inner end of each spring guide has an inwardly extending flange 58 having a bore 60 therein through which rod 26 passes. The enlarged heads 28 of the rods extend into the bores 62 that are centrally located in each foot. A compression spring 64 extends from cylinder 14 to foot 16, the ends of these springs being disposed around bosses 22 and spring guides 56.

As the wheel revolves successive feet come into action so that an adequate traction surface is always available, the wheel readily adapting itself automatically to the surface over which it travels. When it contacts an obstruction such as a stone, the foot automatically yields inwardly to a greater extent, thus absorbing the shock of passing over such obstruction. This operation is illustrated in FIG. 1 wherein one of the sectioned feet 16 is illustrated as being in contact with surface 64, whereas the outer sectioned foot is shown in its undeflected position. Springs 64 normally act to force the feet outwardly from the hub, thus maintaining the periphery of the tread blocks in a substantially circular arc, the outer limit of the tread blocks being maintained by the engagement of the shoulders of heads 28 with flanges 58. In this position of foot 16, spring 64 is under slight compression.

Foot 16 must extend a sufficient distance into chamber 34 to provide adequate structural strength in the fully extended position. When a foot of the type to which the present invention pertains is deflected by contacting an obstacle, rough terrain or the like, spring 64 is compressed and rod 26 advances into bore 62. The sidewall portions of the feet can deflect the entire distance to cylinder 14 due to the recession of a portion of spring 64 in cavity 52. This design permits the feet to deflect a greater distance than that which would be possible in conventional designs wherein the spring contacts the innermost portion of the foot. In its deflected position foot 16 is in contact with a much greater surface area of the walls of chamber 34 so that when the vehicle brakes are applied the force generated thereby is more safely absorbed by the wheel.

Lubrication fittings 68 are located on outer disk 32 adjacent to each chamber 34, and fittings 70 are disposed on disk 38 adjacent to the chambers provided for feet 18. Apertures 66 in the sidewalls 54 of each foot 16 and similar apertures in the sidewalls of each foot 18 permit the passage of lubricant from the chambers to the chamber-forming walls. The flow of lubricant is facilitated by the compression of air within the chambers when the feet deflect.

Figure 3:
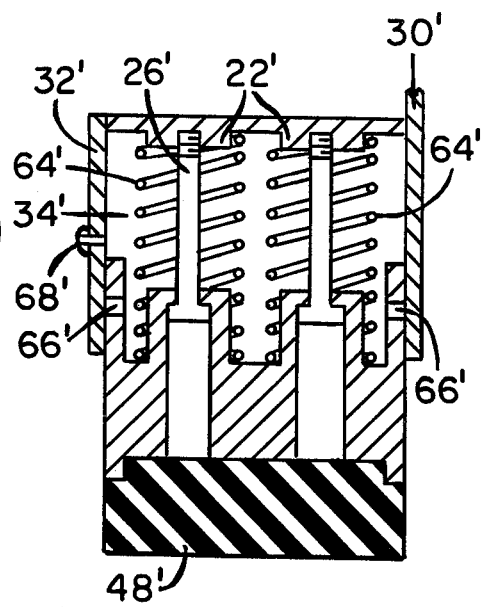
FIG. 3 is a cross-sectional view of another embodiment wherein each foot is provided with two springs.

While the preferred embodiment of the present invention has been shown and described, it is to be understood that the invention also contemplates modifications that do not depart from the spirit of the invention. For example, while chambers 34 have been illustrated as being rectangular in cross-section, other cross-sectional shapes such as circular, elliptical and the like are deemed to be within the scope of this invention. Whereas only one spring is illustrated as being connected to each foot in FIG. 1, a plurality of such springs can be associated with each foot as illustrated in FIG. 3, wherein elements similar to those of FIG. 1 are represented by primed reference numerals. An end of each spring can be recessed in one or more cavities in the foot, the embodiment of FIG. 3 having two cavities 52'.

I claim:

1. A vehicle wheel comprising
a hub,
first and second equally-sized, spaced, coaxial disks, said first disk surrounding said hub and being coplanar therewith,
a first plurality of triangularly shaped members disposed between said first and second disks and being secured thereto, each of said first plurality of members having two identical opposed planar rectangular walls which are secured together at one edge thereof,
a first right circular cylinder which is coaxial with said hub, a first end of said first cylinder being secured to said hub and said first disk, the end of said first cylinder opposite said first end being secured to said second disk, said one edge of said two planar walls of each of said first plurality of members being affixed to said first cylinder, said first plurality of triangularly shaped members being equally spaced around said first cylinder, the space between each of the adjacent ones of said first plurality of members forming along with the adjacent portions of said first and second disks a first plurality of equally spaced chambers, the opposite walls of each chamber being parallel,
a first plurality of feet, one of said feet being disposed in each of said first plurality of chambers and being capable of radial movement, that portion of each of said feet nearest said first cylinder having at least one cavity therein,
means for restricting movement of each of said feet beyond a predetermined distance from said first cylinder so that those portions of said feet remote from said first cylinder tend to lie in a substantially circular arc, and
at least one spring disposed between each of said feet and said first cylinder, one end of each spring being fixedly mounted with respect to said first cylinder, the other end of each spring being disposed within its respective cavity.

2. A wheel in accordance with claim 1 wherein two springs are disposed between each of said feet and said first cylinder, said springs being disposed in a plane passing through the axis of said cylinder.

3. A wheel in accordance with claim 1 wherein the walls of said first plurality of feet are parallel to and closely engage the adjacent walls of said first plurality of chambers so that said chambers are completely enclosed, each of said feet having a cylindrical spring guide disposed in the cavity thereof, each of said guides having a bore therein and an inwardly projecting flange being disposed at the end of each of said bores opposite said foot, said means for restricting movement comprising a plurality of rods, each having an enlarged head at one end thereof adapted to slide in each of said bores, the remaining end of each of said rods being secured to said first cylinder, that end of each of said springs that is disposed in its associated cavity surrounding said guide.

4. A wheel in accordance with claim 3 further comprising a third disk coaxial with said first disk and disposed on that side thereof opposite said second disk, said third disk being identical to said second disk, a second plurality of triangularly shaped members disposed between said first and third disks and being secured thereto, each of said second plurality of members having two identical rectangular, planar walls which are secured together at one edge thereof, a second right circular cylinder which is coaxial with said hub, a first end of said second cylinder being secured to said hub and said first disk, the end of said second cylinder opposite said first end being secured to said third disk, said one edge of said two planar walls of each of said second plurality of members being affixed to said second cylinder, said second plurality of triangularly shaped members being spaced around said second cylinder in staggered relationship with respect to said first plurality of members, the space between each of said second plurality of members forming, along with the adjacent portions of said first and third disks, a second plurality of equally spaced chambers, the opposite walls of which are parallel, a foot disposed in each of said second plurality of chambers and being capable of radial movement, that portion of each of said second plurality of feet nearest said second cylinder having at least one cavity therein, the walls of said feet being parallel to and closely engaging the adjacent walls of said second plurality of chambers, each of said second plurality of feet having a cylindrical spring guide disposed in the cavity thereof, each of said guides having a bore therein, an inwardly projecting flange being disposed at the end of each of said bores opposite said foot, a second plurality of rods, each having an enlarged head at one end thereof adapted to slide in one of said bores, the remaining ends of said second plurality of rods being secured to said second cylinder, and at least one spring disposed between each of said second plurality of feet and said second cylinder, said other end of each spring surrounding its respective spring guide.

5. A wheel in accordance with claim 3 wherein said bores extend beyond said spring guides into said feet, the length of each said bore being greater than one half the length of each said foot as measured radially from the center of said wheel.

6. A wheel in accordance with claim 4 wherein said bores extend beyond said springs into said feet, the length of each said bore being greater than one half the length of each said foot as measured radially from the center of said wheel.

* * * * *